US012307456B2

(12) United States Patent
Maus et al.

(10) Patent No.: US 12,307,456 B2
(45) Date of Patent: May 20, 2025

(54) SYSTEMS AND METHODS FOR DISTRIBUTING EVENT DRIVEN NETWORK SERVICES

(71) Applicant: MASTERCARD INTERNATIONAL INCORPORATED, Purchase, NY (US)

(72) Inventors: Jim Maus, St. Charles, MO (US); Belgi K. Augustine, McKinney, TX (US); Carl D. Jansson, St. Charles, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 88 days.

(21) Appl. No.: 17/749,564

(22) Filed: May 20, 2022

(65) Prior Publication Data

US 2022/0374892 A1 Nov. 24, 2022

Related U.S. Application Data

(60) Provisional application No. 63/191,711, filed on May 21, 2021.

(51) Int. Cl.
G06Q 20/00 (2012.01)
G06Q 20/38 (2012.01)
G06Q 20/40 (2012.01)

(52) U.S. Cl.
CPC ....... *G06Q 20/401* (2013.01); *G06Q 20/3821* (2013.01); *G06Q 20/4016* (2013.01)

(58) Field of Classification Search
None
See application file for complete search history.

(56) References Cited

U.S. PATENT DOCUMENTS 10,833,881 B1 11/2020 Jindal et al.
11,580,546 B2* 2/2023 Murray .............. G06Q 20/3224
(Continued)

OTHER PUBLICATIONS

Kusedghi; XeniumNFV_ A Unified, Dynamic, Distributed and Event-Driven SDN; IEEE pp. 320-326; 2018.*
(Continued)

*Primary Examiner* — Radu Andrei
(74) *Attorney, Agent, or Firm* — Harness, Dickey & Pierce, P.L.C.

(57) ABSTRACT

Systems and methods herein provide event-drive network services. One exemplary method includes providing event-driven services in a network, where the network includes an edge messaging platform, a communication manager coupled to the edge message platform and associated with a first customer, a messaging platform different that the edge message platform, a first computing device coupled to the edge message platform, and a second computing device coupled to the messaging platform. The method includes subscribing, by the first computing device, to a first event topic on the edge message platform; consuming, by the first computing device, a first event published to the first event topic by the communication manager; and publishing a second event to the messaging platform where the second computing device is then permitted to consume the second event from the messaging platform to communicate data included in the second event to a second consumer.

20 Claims, 3 Drawing Sheets

(56) References Cited

U.S. PATENT DOCUMENTS

| | | |
|---|---|---|
| 2007/0165625 A1 | 7/2007 | Eisner et al. |
| 2018/0007035 A1 | 1/2018 | Zhang et al. |
| 2018/0287969 A1 | 10/2018 | Broadhurst et al. |
| 2019/0095608 A1* | 3/2019 | Kohli .................. G06Q 20/405 |
| 2019/0266599 A1* | 8/2019 | O'Sullivan ............ G06Q 20/18 |
| 2020/0244770 A1 | 7/2020 | Cooley et al. |
| 2021/0192476 A1* | 6/2021 | Swaminathan ..... H04W 12/106 |
| 2021/0398124 A1* | 12/2021 | Bhasin ............... G06Q 20/4016 |
| 2022/0084031 A1* | 3/2022 | Hou .................. G06Q 20/4014 |
| 2022/0114593 A1* | 4/2022 | Johnson ............ G06F 18/24133 |
| 2022/0114594 A1* | 4/2022 | Nunes ................ G06Q 20/4016 |
| 2022/0215392 A1* | 7/2022 | Wied ...................... G06F 9/547 |
| 2022/0377052 A1 | 11/2022 | Thumma et al. |

OTHER PUBLICATIONS

Zhang; Integrating Events into SOA for IoT Services; IEEE pp. 180-186; 2017.*

Kusedghi; XeniumNFV_A Unified, Dynamic, Distrubted and Event-Driven; IEEE CloudCom; pp. 320-326; 2018.*

Zhang; Integrating Events into SOA for IoT Services; MCOM2017; pp. 180-186; 2017.*

* cited by examiner

SYSTEMS AND METHODS FOR DISTRIBUTING EVENT DRIVEN NETWORK SERVICES

CROSS-REFERENCE TO RELATED APPLICATION

This application claims the benefit of, and priority to, U.S. Provisional Application No. 63/191,711, filed May 21, 2021. The entire disclosure of the above application is incorporated herein by reference.

FIELD

The present disclosure generally relates to systems and methods for providing event driven network services.

BACKGROUND

This section provides background information related to the present disclosure which is not necessarily prior art.

Networks are known to provide various services, depending, for example, on types of the networks. In connection with payment networks, for example, the networks are known to coordinate communications between different institutions to facilitate fund transfers, whereby the payment networks provide processing services. The communications involve messaging, which may be local to given regions, or between multiple regions. In general, the services are known to rely on message driven architectures, wherein recipients of the messaging await the arrival of the messaging and then react. In connection therewith, originators of the messaging are responsible for properly directing the messaging and also conforming with regulations related to the messaging.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Networks may provide services in conjunction with processing purchase transactions by consumers, businesses, governments, etc. (all broadly users). The services may be directly related to processing of transactions (e.g., authorization, clearing, settlement, etc.) (e.g., ACH transactions, etc.) or may relate indirectly to the transactions (or may be independent of the transactions) as value added services (e.g., digital identity services, marketing services, fraud prevention services, reward services, loyalty services, consumer insight services, account control services, authentication services, etc.), etc. In connection therewith, the originator, or intermediary, of messaging associated with the services is required to possess specific knowledge about technical routing, pathways, and destinations of the messaging to properly invoke such services. The knowledge may be cumbersome to disseminate and/or update in view of changes to associated services and/or underlying routing associated therewith.

Uniquely, the systems and methods herein provide event-driven architectures, whereby requests are published to messaging platforms under specific topics, and services then subscribe to the topics in order to fulfill the requests. In particular, as a request is received from a customer, the request is converted to an event, having a specific topic, and published to a messaging platform. The event is consumed by (or identified to) an appropriate service, and the service is performed for the event (e.g., a token lookup, a fraud scoring, etc.). The service then publishes the request as another event to the messaging platform, under a further topic, so that additional services may be performed for the request. Or, the request is directed back to the customer or to a different customer (if no further services are to be performed). In this manner, services are permitted to subscribe to appropriate event topics on the messaging platform, whereby the services may then be invoked by the events upon identification of appropriate topics for the events. As such, topics for the events are relied upon to promote loose or dynamic coupling between services, thereby providing efficiency in introducing new services/subscribers, in implementation of incremental steps, and in further geographic instances of the service without changing the underlying codes of the services, etc. What's more, recognition of the events by the services may occur more quickly, whereby the services may be implemented for faster response.

Figure 1:
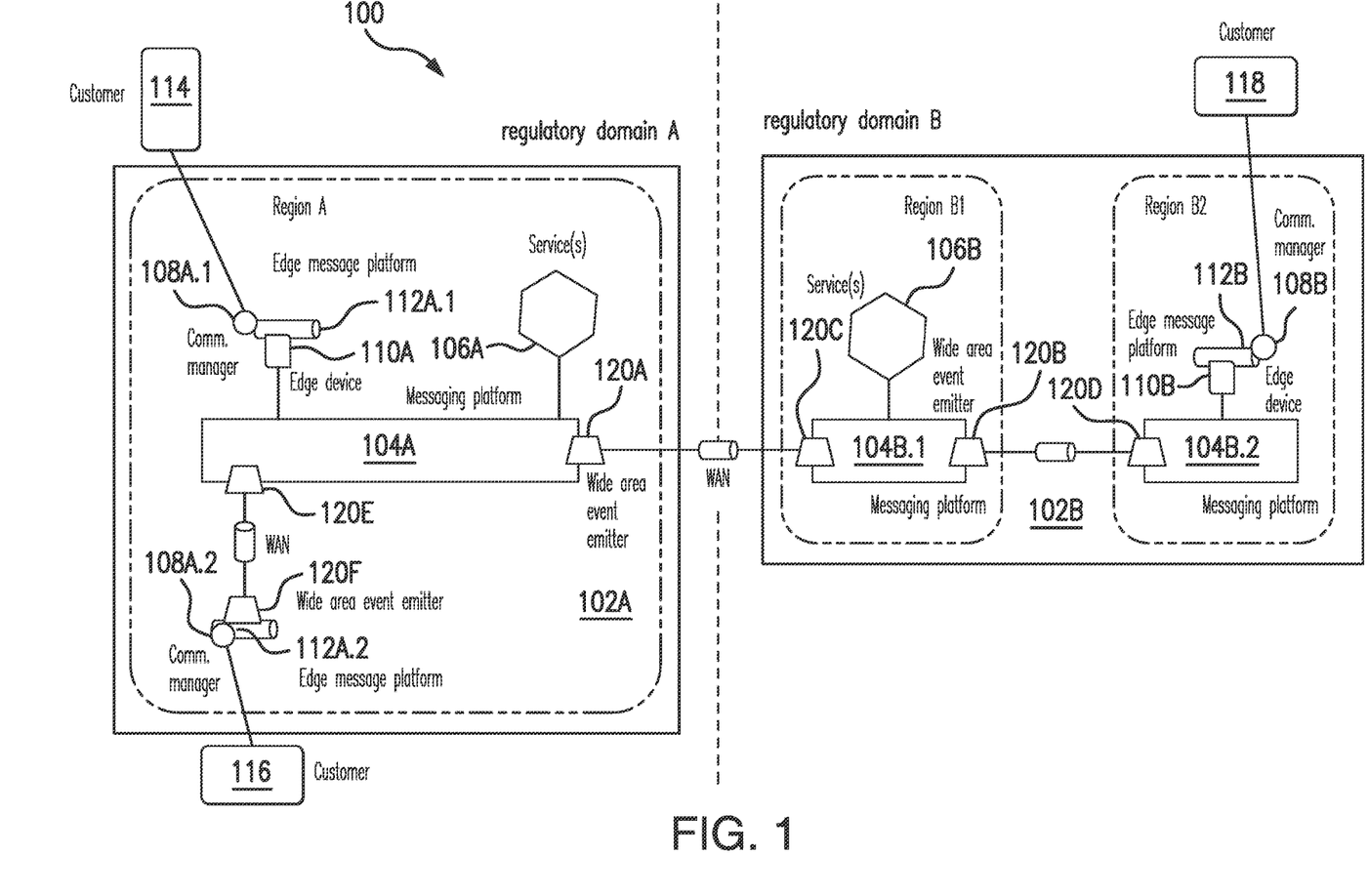
FIG. 1 is a block diagram of an exemplary system of the present disclosure suitable for use in providing event driven network services, initiated, for example, in response to requests from customers.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, services associated with payment accounts and payment account transactions, privacy rules and/or regulations, etc.

As shown in FIG. 1, the system 100 includes a payment network, which in this embodiment, is organized into two regulatory domains, regulatory domain A 102A and regulatory domain B 102B. As such, the payment network includes the two regulatory domains 102A-B in this embodiment. However, it should be appreciated that the system 100 (and payment network) may include further regulatory domains in other embodiments, or further still may be defined apart from regulatory domains. In this embodiment, though, the regulatory domains 102A-B are defined, generally, by regulations and/or restrictions specific to the domain, whereby the regulations and/or restrictions in one domain are different, at least in part, than in the other domain(s). That said, the regulatory domains 102A-B may be defined as different sovereign countries or nations (or within countries or nations), or different continents, or otherwise, depending on the regulations and/or restrictions associated with the domains. As such, it should be appreciated that other system embodiments may include more or less regulatory domains, depending, for example, on the geographic presence of the payment network, etc.

Additionally, as shown in FIG. 1, the payment network is disposed in multiple different regions, including, in region A in the regulatory domain 102A, and in two regions B1 and B2 in the regulatory domain 102B, whereby there are three different regions in total. Initially, as above, it should be appreciated that a different number of regions may be included in other system embodiments, or also within different regulatory domains. For example, a regulatory domain may include one, two, three, four, or more regions, etc. The regions may be defined as different data centers, locations, sites, entities, systems, etc., which may or may not be located in different sovereign countries or nations, territories, states, counties, cities, postal codes, or other geographical divisions, etc. As such, as an example, the regulatory domain 102B may represent Europe, with region B1 in regulatory domain 102B representing a data center in London, and region B2 in regulatory domain 102B representing a cloud region (e.g., a Microsoft® Azure region, etc.) in Germany. Generally, as shown in FIG. 1, each of the regions A, B1, B2 are included in (or are contained within) one of the regulatory domains 102A-B (e.g., in the illustrated embodiment region A is included in regulatory domain 102A and regions B1 and B2 are contained in regulatory domain 102B, etc.).

That said, within each of the regions A, B1, and B2 in FIG. 1, the system 100 includes multiple messaging platforms 104A, 104B.1, and 104B.2, which are consistent with the event driven framework herein, and whereby a publisher is able to publish different events with each type of event going to a different topic, and with subscribers to the topic able to act on the events published to the topics. As such, the messaging platforms 104A, 104B.1, and 104B.2, which may be referred to as message spines in the respective regions, are configured to cooperate in order to handle events (and associated services subscribed to various topics to which the events may be directed or published) within the regions A, B1, and B2, and within the regulatory domains 102A and 102B. It should be appreciated that multiple instances of the messaging platforms 104A, 104B.1, and 104B.2 may be included, per region, based on, for example, availability, load, fault tolerance, etc., of the region, etc. What's more, the messaging platforms 104A, 104B.1, and 104B.2 are illustrated as being separate in the different regions A, B1, and B2 represented in FIG. 1. It should be appreciated that one or more of the messaging platforms 104A, 104B.1, and 104B.2 may use a wide area event emitter (WAEE) to deliver messages to other regions (which may be implemented using, for example, a messaging system such as NATS Super Cluster gateway connections, etc.). For instance, in the illustrated embodiment, messaging platform 104A and messaging platform 104B.1 are illustrated as using WAEE 120A and 120B, respectively. Therefore, certain messaging implementations may be considered as extending messaging platform functionality across regions (e.g., across region A and one of regions B1 and B2, across regions B1 and B2, etc.). That said, each messaging platform 104A, 104B.1, and 104B.2 may include one or more WAEEs in some embodiments.

It should be understood that the payment network (including the regulatory domains 102A and 102B, but not customers 114, 116, and 118) is further configured, generally, to at least coordinate payment account transactions between users (e.g., acquirer banks, issuer banks, etc.), and may further be configured to provide services described in more detail below. In connection therewith, the payment network includes various services, which may include, for example, authorization messaging services, fraud scoring services, regulatory compliance services, cross-border messaging services, currency conversion services, token vault services, etc. In various implementations, example event driven designs described herein may provide advantages in allowing services to be added or removed (e.g., by topic, etc.) with minimal or no impact on existing services. The services of the payment network are illustrated in FIG. 1, at 106A in regulatory domain 102A and then at 106B in regulatory domain 102B. It should be appreciated that the services may be region specific, or regulatory domain specific, or alternatively, shared among multiple region and/or regulatory domains. For example, certain services included in the services 106A and 106B may be duplicates of one another (e.g., whereby service(s) 106A and service(s) 106B each include an economics service, etc.) (whereby events directed to the service(s) are directed to the service(s) in the same regulatory domain), while other services may be included in only one regulatory domain (in general or for a specific account or customer) (whereby events directed to those services would be directed to that region and/or regulatory domain). The particular services provided in the system 100 are described in more detail below.

Further, as shown in FIG. 1, the payment network (of the system 100) includes multiple communication managers 108A.1, 108A.2, and 108B, multiple edge devices 110A and 110B, multiple wide area event emitters (WAEEs) 120A-F, and multiple edge message platforms 112A.1, 112A.2, and 112B to provide customers with access to the respective messaging platforms and the services associated therewith. In the illustrated embodiment, the edge message platforms 112A.1, 112A.2, and 112B are different than the messaging platforms 104A and 104B.1 and 104B.2 (e.g., messaging platforms located at a switch, etc.). However, in some embodiments, the platforms may overlap at least in part and/or may be the same platforms. In addition, the edge devices 110A and 110B and the WAEEs 120A-F may be viewed as or referred to as consumption computing devices herein, in that they are configured to consume events published to various event topics, for example, at the edge message platforms 112A.1, 112A.2, and 112B and/or at the messaging platforms 104A, 104B.1, and 104B.2, and then are configured to publish the consumed events accordingly (as described herein).

The communication managers 108A.1 and 108A.2 and edge device 110A are situated in region A of the regulatory domain 102A. And, the communication manager 108A.1 and the edge device 110A are coupled to the edge message platform 112A.1, while the communication manager 108A.2 is coupled to the edge message platform 112A.2. The communication manager 108B and the edge device 110B are situated in the region B2 of the regulatory domain 102B, and are coupled to the edge message platform 112B. In this exemplary embodiment, the communication manager 108A.1, for example, is configured to manage communication with the customer 114, the communication manager 108A.2, for example, is configured to manage communication with the customer 116, and the communication manager 108B is configured to manage communication with the customer 118.

While the communication managers 108A.1, 108A.2, and 108B are generally associated with messaging from customers, the edge devices 110A and 110B and the WAEEs 120A-F are generally configured to facilitate flow of events to different platforms, whether in the same region or regulatory domain, or different regions or regulatory domains. Consistent therewith, the WAEE 120A is associated with the messaging platform 104A. The WAEE 120A, in this example, then (e.g., as a consumption computing device, etc.), is subscribed to topics associated with events directed to different platforms in different regions and/or regulatory domains (e.g., region B1 and region B2, etc.), is configured to consume such events, and is configured to then publish the events accordingly. The WAEEs 120B and 120C are associated with the messaging platform 104B.1, and the WAEE 120D is associated with the messaging platform 104B.2. The WAEEs 120B, 120C, and 120D may also be subscribed to topics associated with events directed to different platforms in different regions and/or regulatory domains, and be configured to consume such events and to then publish the events accordingly. It should be appreciated that the edge device 110A and the edge device 110B may be similarly configured.

In general, an edge message platform may communicate with a messaging platform via one or more WAEEs or via an edge device (e.g., broadly a consumption computing device, etc.). For example, in the system 100, the edge message platform 112A.1 is connected with the messaging platform 104A via the edge device 110A (and one or more network connection(s)). And, the edge message platform 112A.2 is connected with the messaging platform 104A over a wide area network (WAN) (generally between WAEEs 120E and 120F). In particular, WAEE 120E is coupled with the messaging platform 104A, and WAEE 120F is coupled with the edge message platform 112A.2. That said, the use of a WAEE or an edge device between a messaging platform and an edge message platform may depend on a distance of the edge message platform from the messaging platform (where WAEEs are used for longer distances), a latency of data transmission between the messaging platform and the edge message platform (where an edge device is used for lower latency connections), the presence of a WAN connection between the messaging platform and the edge message platform (where WAEEs are used for WAN connections), etc.

Similar to the messaging platforms 104A, 104B.1, and 104B.2, it should be appreciated that multiple instances of each of the edge devices 110A and 110B may be included in the system 100, per region and/or message/messaging platform, based on, for example, availability, load, fault tolerance, etc., of the region, etc. In various implementations, multiple instances of a service that are each subscribing to a topic may be defined as a consumer group. In connection therewith, then, a messaging platform may deliver an event only once to any one of the instances in the consumer group.

In the exemplary embodiment of FIG. 1, the customers 114, 116, and 118 may include banks, financial institutions, or other parties associated with and/or in communication with the payment network. In general, the customers 114, 116, and 118 are configured to communicate with the payment network in the region in which each of the customers 114, 116, and 118 is situated. As such, the customer 114 is situated in region A, and the customer 114 is configured to communicate with the communication manager 108A.1 situated in region A. Likewise, the customer 118 is situated in region B, and the customer 118 is configured to communicate with the communication manager 108B situated in region B.

In view of the above, in general in operation of the system 100, each of the regulatory domains 102A and 102B in the system 100 is configured to receive requests and/or communications from customers, e.g., the customers 114, 116 and 118, and to communicate the requests/communications to the one or more appropriate services through events published to the various ones of messaging platforms 104A, 104B.1, and 104B.2 included therein.

Table 1 illustrates a general sequence or flow of events for messaging included in the region A and involving the customer 114, the payment network, and the customer 116. Initially, the customer 114 requests a message be sent to the other customer 116 (e.g., an authorization request, an ACH or other transaction request, a digital identity task, etc.). In response to the request, the communication manager 108A.1 is configured to convert the message to an event associated with the topic "unhandled events" with event type "Event 1" and to publish the event to the edge message platform 112A.1, at time T0. In this example, the edge device 110A is subscribed to the topic "unhandled event", and configured to consume (e.g., pick up, etc.) the event directed to the topic having the event type "Event 1" and, in turn, to publish an event on the messaging platform 104A in the region A, at time T1 (e.g., as a consumption computing device, etc.). The event is published to the topic E1 messages with an event type "Event 1", which may be indicative of a service (in region A) associated with and/or to which the event is directed. The service(s) subscribed to the topic and event type is/are then configured to consume the event, perform the appropriate service(s), and then to publish a further event to the messaging platform 104A. The service(s) continue until the published event is ready to be directed to the customer 116, whereby one of the services is configured to publish an event with the topic E2 message with the event type of "Event 2", in this example, to the messaging platform 104A.

TABLE 1

| Time | Message Platform | Publisher | Event Type | Topic | Subscriber |
|---|---|---|---|---|---|
| T0 | Edge Message Platform 112A.1 (Customer 114) | Communication Manager 108A.1 | "Event 1" | Unhandled Events | Edge Device 110A |
| T1 | Messaging Platform 104A | Edge Device 110A | "Event 1" | E1 Messages | Subscriber X |
| . . . | . . . | . . . | . . . | . . . | (other events not shown) |
| Tn | Messaging Platform 104A | Business Function Y | "Event 2" | E2 Messages | WAEE 120E |
| Tn + 1 | Edge Message Platform 112A.2 (customer 116) | WAEE 120F | "Event 2" | E2' Messages | Communication Manager 108A.2 |

In response, the WAEE 120E is subscribed to the E2 message topic and is configured, based on the event type "Event 2", to consume the event and publish (in conjunction with the WAEE 120F) an event to the E2 message topic with the event type "Event 2" on the edge message platform 112A.2 associated with the customer 116. The communication manager 108A.2 is subscribed to the E2' topic, and is configured to, based on the event type of "Event 2", consume the event and communicate the event, or underlying data, to the customer 116.

It should be appreciated that Table 1 illustrates a general flow of events relating to messaging from one customer to another, whereby one or more services may be imposed in response to the customer's communicating with the payment network, depending, for example, on the type of communication, etc. As such, it should be appreciated that a reply from the customer 116 to the customer 114, in the region A, may be substantially similar, to the sequence included in Table 1 (and a similar series/flow of events, etc.). It should further be appreciated that the sequence in Table 1 may be adapted to various different messages and/or requests between two customers (e.g., between customers 114 and 116, etc.).

While Table 1 is general to various different types of messages, Table 2 is specific to an authorization request sequence for a transaction to a payment account. The sequence (or flow) in Table 2, then, is specific to a single regulatory domain, or regulatory domain 102A, in this example.

TABLE 2

| Time | Message Platform | Publisher | Event Type | Topic | Subscriber |
|---|---|---|---|---|---|
| 1 | Edge Message Platform 112A.1 | Communication Manager 108A.1 | "IND Auth Received" | Unhandled Events | Edge Device 110A |
| 2 | Messaging Platform 104A | Edge Device 110A | "IND Auth Received" (forwarded from Edge) | Unhandled Events | Auth Processor |
| 2.1a | Messaging Platform 104A | Auth Processor | Auth Request Received | ISO Messages | Retrieve Party Information |
| 2.1b | | | Auth Response Received | | (further detail not shown) |
| 2.1c | | | Auth Response Confirmed | | (further detail not shown) |
| 3 | Messaging Platform 104A | Retrieve Party Information | Party Information Updated | Party Info | SEM Service (for "early" services such as MDES) |
| 4 | Messaging Platform 104A | SEM Service | Early Services Completed | Early Services | Retrieve Party Information (For additional Party Info) |
| 5 | Messaging Platform 104A | Retrieve Party Information | Additional Party Information Updated | FPAN Updates | Determine Transaction Scheme |
| 6 | Messaging Platform 104A | Determine Transaction Scheme | Transaction Scheme Updated | Scheme | Transaction Life Cycle |
| 7 | Messaging Platform 104A | Transaction Life Cycle | Life Cycle ID Assigned | Life Cycle | Determine Business Context |
| 8 | Messaging Platform 104A | Determine Business Context | Business Context Determined | Bus Context | Calculate Economics |
| 9 | Messaging Platform 104A | Calculate Economics | Economics Calculated | Economics | SEM Service (for "late" services) |
| 10 | Messaging Platform 104A | SEM Service | Late Services Completed | SEM | Update Transaction State |
| 11 | Messaging Platform 104A | Update Transaction State | Transaction State Updated | Late Services | Issuer Auth |
| 12 | Messaging Platform 104A | Issuer Auth | <Issuer> Message Received | <Issuer> Auth | WAEE 120E |
| 13 | Edge Message Platform 112A.2 | WAEE 120E | <Issuer> Message Received | Authorize | Communication Manager 108A.2. |

At the outset in this flow (or method), the customer 114 provides an authorization request for a payment account transaction to a payment account issued by the customer 116 in regulatory domain 102A, to the payment network, and in particular, to the communication manager 108A.1. At time T1, the communication manager 108A.1 is configured to convert the request to an event and to publish the event to the edge message platform 112A.1. The event is published as an "IND Auth Received" event to the unhandled events topic (which is indicative of the type of request: authorization, and the regulatory domain: IND or India for regulatory domain 102A). The edge device 110A is subscribed to the topic and is thus configured to consume the event based on the event type, and to publish, in turn, an event to the unhandled events topic on the messaging platform 104A, at time T2.

The Auth processor service (included in the services 106A), as a subscriber to the unhandled events topic, is configured to consume the event (based on the "IND Auth Received" event type) and to publish an "Auth Request Received" event to the ISO message topic. In response, several subsequent events are published and subscriber actions/services are then completed by various ones of the services 106A between T3 and T11. At T12, the Issuer Auth service from the services 106 is configured to determine the issuer of the payment account, or the customer 116. The Issuer Auth service is then configured to publish a "<issuer> Message Received" event to the <issuer> Auth topic on the messaging platform 104A. The WAEE 120E is subscribed to the topic, and is configured to consume the event based on the event type and to publish an "<Issuer> Message Received" event on the authorization topic of the edge message platform 112A.2. The communication manager 108A.2 in turn is configured to consume the event based on the event type and to send an authorization message to the customer 116 (i.e., the issuer of the payment account involved in the transaction).

An authorization reply message is then initiated, by the customer 116 to the customer 114, via the messaging platform 104A, in a similar manner.

Further, it should be appreciated based on FIG. 1, that a request for messaging from a customer may be directed and/or associated with another region, or another regulatory domain. As such, further devices may be associated with the messaging platforms 104A, 104B.1, and/or 104B.2, and with other regions or regulatory domains. Specifically, for example, the messaging platform 104A includes WAEE 120A, which may communicate with messaging platforms in other regions (e.g., over a WAN, etc.). As such, a request and/or one or more service(s) 106A may publish an event to a topic specific to the regulatory domain 102B (e.g., a transaction directed to or associated with the regulatory domain 102B, etc.). In connection therewith, the WAEE 120A may subscribe to that topic related to the regulatory domain 102B, and may be configured to consume the event and publish an event to the messaging platform 104B.1 in the regulatory domain 102B.

Table 3 is specific to an authorization request sequence for a transaction to a payment account, involving multiple regulatory domains. The sequence is provided for a cross-border transaction, where a user with a payment account issued by the customer 118 initiates a transaction in region A, at customer 114. In this example, the communication manager 108A.1 is configured to convert the transaction request (as received from the customer 114) to an event and publish the event to the edge message platform 112A.1. The edge device 110A is then configured to consume the event based on the event type and topic and to publish an "Auth Request" event to the ISO message topic. The events proceed as generally described above with regard to Table 2, through one or more of the services 106A associated with the transaction.

TABLE 3

| Time | Message Platform | Publisher | Event Type | Topic | Subscriber |
|---|---|---|---|---|---|
| T 1 | Edge message platform 112A.1 | Communication Manager 108A.1 | "Auth Requested" | Unhandled Events | Edge Device 110A |
| T2 | Messaging platform 104A | Edge device 110A | "Auth Requested" | ISO Message | Retrieve Party Information |
| . . . | . . . | . . . | . . . | . . . | (other events not shown) |
| Tn | Messaging platform 104A | Issuer Auth | 102B Issuer Auth Received or EUR Issuer Auth Received GBR Issuer Auth Received RUS Issuer Auth Received USA Issuer Auth Received | 102B Issuer Auth or EUR Issuer Auth GBR Issuer Auth RUS Issuer Auth USA Issuer Auth | WAEE 120A |
| Tn + 1 | Messaging platform 104B.2 | WAEE 120A (inbound from IND spine) | 102B Issuer Auth Received | 102B Issuer Auth | Edge Device 110B |
| . . . | . . . | . . . | . . . | . . . | (other events not shown) |
| Tn + 2 | Edge message platform 112B (XXX Issuer) | Edge Device 110B (inbound from spine) | 102B Issuer Auth Received | Authorize | Communication Manager 108B |

Then, at time Tn, the Issuer Auth service of the services 106A is configured to consume the DID Issuer Auth Received event (where DID is the particular regulatory domain involved (e.g., EUR, GBR, RUS, USA, etc.)) and to determine the event is related to a payment account issued in regulatory domain 102B (e.g., a European issued card, etc.). The Issuer Auth service of the services 106A is configured to then publish a corresponding event to the messaging platform 104A. At time Tn+1, the WAEE 120A is configured to consume the event, based on the event type, and to publish a "102B Issuer Auth Received" event to the messaging platform 104B.2 in the regulatory domain 102B (based on the event topic). It should be appreciated that one or more of the services 106B may then be configured to act on the event, if desired (e.g., via messaging platform 104B.1, etc.). In various implementations, the WAEE 120A may be configured to deliver the event message directly to the messaging platform 104B.2, and/or to route the event message to the messaging platform 104B.2 through the messaging platform 104B.1 (which may include use of the WAEE 120B and the WAEE 120D to send the event message from the messaging platform 104B.1 to the messaging platform 104B.2). When complete, the edge device 110B is subscribed to the "102B Issuer Auth" topic and configured to consume the event and publish the event to the "102B Issuer Auth Received" event to the authorize messages topic on the edge message platform 112B associated with the customer 118, at time Tn+2. The communication manager 108B is subscribed to the Authorize topic, and is configured to, based on the event type, consume the event and communicate the event, or underlying data, to the customer 118.

It should be appreciated that edge devices may be similarly situated and configured to provide for event publication across different regions, or further regulatory domains, etc. As such, it should be appreciated that one or more regulation(s) and/or restriction(s) may be imposed through the edge devices. In various implementations, regulatory enforcement may be handled by different services that are connected to the messaging platforms, where various services (e.g., payment, fraud, rewards, loyalty, etc.) in different domains may use various types of data, and each service may have to determine what data may be sent to other regulatory domains. If a service determines that data is allowed to be sent, the service may hand the data over to the wide area event emitter as an outbound topic.

It should also be appreciated, as explained above, that the system 100 is merely exemplary in nature. In other system embodiments, there may be additional regulatory domains, and more or less regions per regulatory domain. In addition, there may be any suitable number of instances of the messaging platforms, edge devices, communication managers, edge message platforms, etc., depending, for example, on fault tolerances, availability, geographic distribution of the payment network (and services included therein and/or associated therewith), etc.

Figure 2:
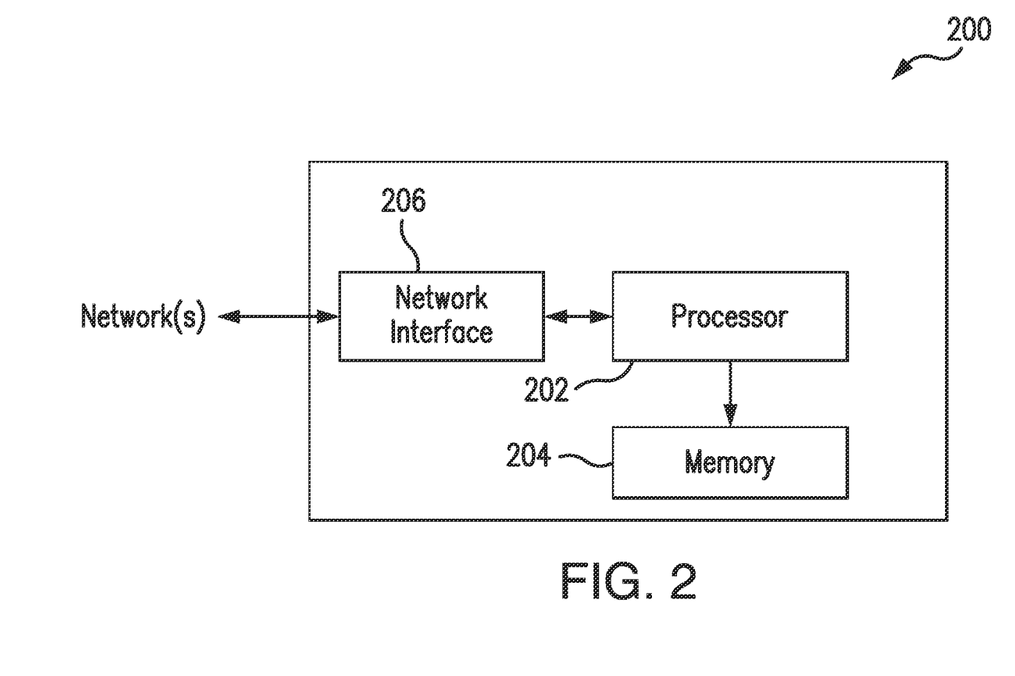
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, containers, workstations, computers, laptops, point-of-sale (POS) devices, etc. In addition, the computing device 200 may include a single computing device, or it may include multiple computing devices located in close proximity or distributed over a geographic region, so long as the computing devices are configured to function as described herein. In the system 100, the messaging platforms 104A, 104B.1 and 104B.2, the services 106A and 106B, the communication managers 108A.1, 108A.2, and 108B, the edge devices 110A and 110B, the edge message platforms 112A.1, 112A.2, and 112B, and the WAEEs 120A, 120B, 120C, 120D, 120E, and 120F, along with the customers 114, 116 and 118, each may include, or may be implemented in one or more computing devices generally consistent with the computing device 200. The computing device 200 may include a physical device included in the payment network of FIG. 1, for example, or be indicative of a physical or logical computing device associated or included in a cloud-based platform. That said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a programmable gate array (e.g., a field programmable gate array (FPGA), etc.), a system on chip (SOC), and/or any other circuit or processor capable of the operations described herein. In the system 100, for example, each of the edge devices 110A and 110B may include a hardware processor, such as, for example, an FPGA, PLD, ASIC, etc., whereby operations performed thereby are implemented directly in hardware in the device, rather than in software in a general purpose processor, as described more below.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, topics (e.g., indicative of regions, or not, etc.), services, and/or other types of data (and/or data structures) suitable for use as described herein. Furthermore, in various embodiments, computer-executable instructions, i.e., software instructions, may be stored in the memory 204 for execution by the processor 202 to cause the processor 202 to perform one or more of the operations described herein (e.g., of the method 300 etc.), such that the memory 204 is a physical, tangible, and non-transitory computer readable storage media. Such instructions often improve the efficiencies and/or performance of the processor 202 that is performing one or more of the various operations herein, whereby in performing the operations the computing device 200 is transformed into a special purpose computing device. In addition, one or more load files may be stored in memory 204, which include hardware descriptions that, when loaded to the processor 202 (or another processor), cause the processor 202 to be structured consistent with the descriptions herein (e.g., descriptions of gate array arrangements/configurations, etc.).

Further, the illustrated computing device 200 also includes a network interface 206 coupled to (and in communication with) the processor 202 (and/or the memory 204). The network interface 206 may include, without limitation, a wired network adapter, a wireless network adapter, a mobile network adapter, or other device capable of communicating to one or more different networks, for example, as included in the system 100. Further, in some exemplary embodiments, the computing device 200 includes the processor 202 and one or more network interfaces 206 incorporated into or with the processor 202.

Figure 3:
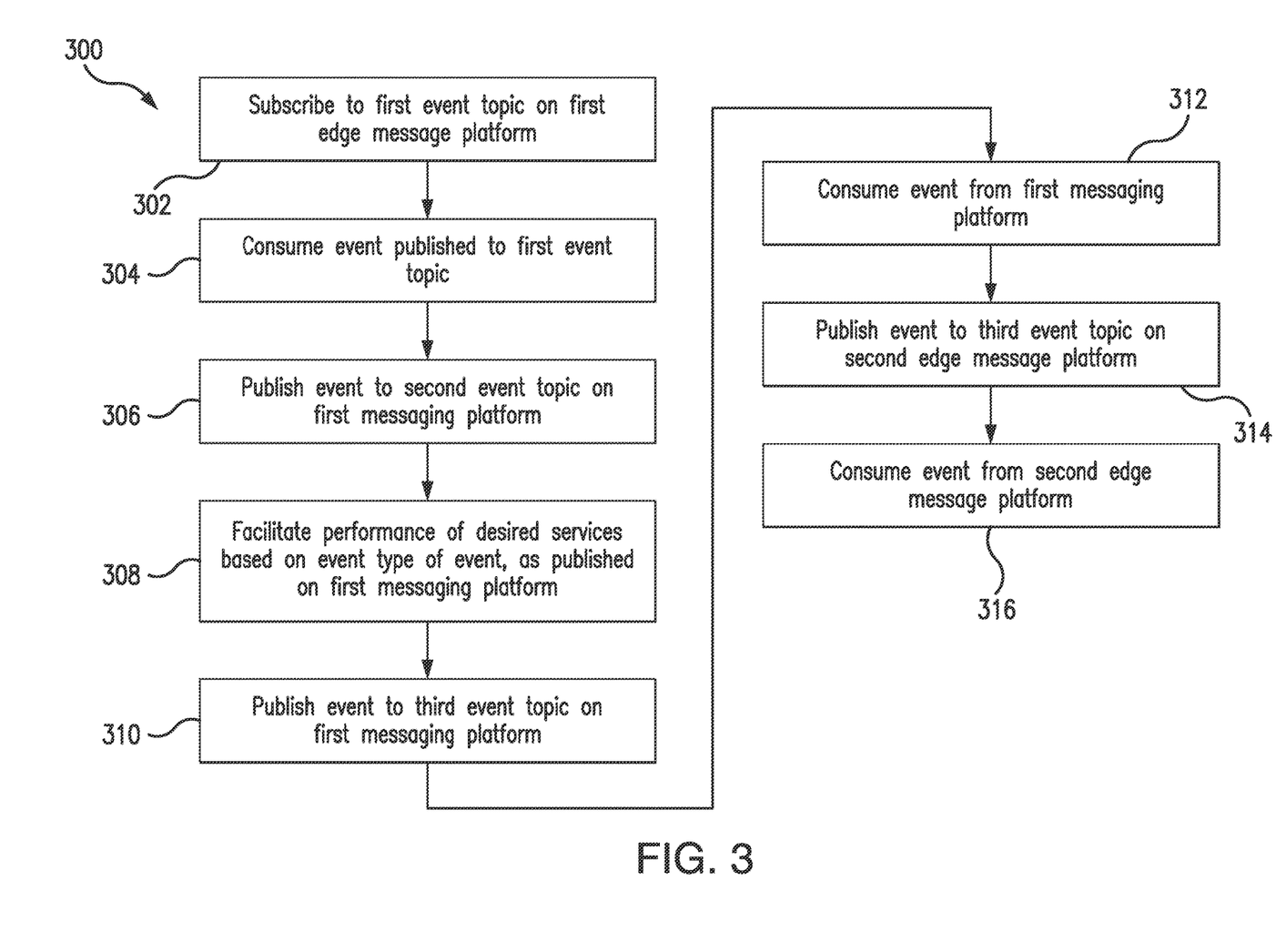
FIG. 3 is a flowchart depicting an example method of providing event-driven services in a network.

FIG. 3 illustrates an example method 300 for use in executing logic to provide event-driven services in a network. The example method 300 is described as implemented in the system 100. Reference is also made to the computing device 200. It should be understood, though, that the methods herein are not limited to the system 100 or the computing device 200, as the methods may be implemented in other systems and/or computing devices. Likewise, the systems and the computing devices herein should not be understood to be limited to the example method 300. What's more, it should be appreciated that, in various implementations, the method 300 may be implemented on one or more cloud-based computing devices.

At the outset in the method 300, the edge device 110A subscribes, at 302, to a first event topic on the edge message platform 112A.1. For example, the edge device 110A may subscribe to a topic "unhandled events." In connection therewith, as part of an interaction between the customer 114 and the customer 116, the customer 114 may request (to the communication manager 108A.1) that a message be sent to the customer 116, such as an authorization request for a transaction, an ACH request or other transaction request, a digital identity task message, etc. In response, the communication manger 108A.1 may convert the requested message to an event (e.g., a first event related to the customer's message, etc.) and publish the event to the edge message platform 112A.1 under the topic "unhandled events" as a first event type (e.g., as "Event 1", etc.)

In response to publication of the event to the first event topic as the first event type (and based on its subscription to the first event topic), the edge device 110A consumes, at 304, the event. For example, the edge device 110A may detect that the event was published on the edge message platform 112A.1 under the topic "unhandled events" as the first event type, and therefore consume the event due to its subscription to the "unhandled events" topic (and due, at least in part, to the identification of the event as the first event type).

In turn, the edge device 110A then publishes an event (e.g., a second event related to the customer's message, etc.) to the messaging platform 104A, at 306, under a second event topic (e.g., an "E1 messages" topic, etc.) as the first event type (thereby generally indicating, at least in part based on the first event type identification, what services are required to be performed on the event). In doing so, the edge device 110A may consume the event published on the edge message platform 112A.1 and facilitate performance of desired services associated with the consumed event (via the service(s) 106A),at 308. In particular, the service(s) 106A may be associated with subscriptions to the second event topic (at the messaging platform 104A), whereby the service(s) is/are performed based on the identification of the event as the first event type, etc. (see, e.g., Tables 1-3, etc.)). Example services that may be performed include, but are not limited to, authorization messaging services, fraud scoring services, regulatory compliance services, cross-border messaging services, currency conversion services, and token vault services. Then, once the desired services are performed, the edge device 110A, for example, publishes, at 310, an event (e.g., a third event related to the customer's message, etc.) to the message platform 104A under a third event topic (e.g., an "E2 messages" topic, etc.) as a second event type (e.g., as "Event 2", etc.). In doing so, the second event type general indicates that the desired services have been performed with regard to the event.

Next in the method 300, the WAEE 120E is subscribed to the third event topic on the messaging platform 104A and, in response to publication of the event under the third event topic, consumes, at 312, the second event at/from the messaging platform 104A (e.g., based the second event type identification of the event, etc.). The WAEE 120E then communicates with the WAEE 120F, via a WAN, etc., to publish, at 314, a further event (e.g., a fourth event, etc.) to the edge message platform 112A.2 under the third event topic (as the second event type) (e.g., as an output event, etc.). The communication manager 108A.2, in turn, is subscribed to the third event topic (at the edge message platform 112A.2) and in response to the publication thereof (and based on the second event type indication for the event) consumes, at 316, the event and sends a corresponding message to the customer 116 based on the data included in the event (as the second event type).

In some implementations of the method 300, after the edge device 110A publishes an event to the messaging platform 104A (under the third event topic), the WAEE 120A may consume the event (based on the WAEE 120A being subscribed to the third event topic at the messaging platform 104A, etc.) (e.g., where the customer 114 desires to communicate with the customer 118 in regulatory domain B; etc.). In doing so, the WAEE 120A may then publish an event to the messaging platform 104B.1 whereby additional services 106B may be applied thereto in region B 1, etc., and whereby data included in the event may then eventually be communicated to the customer 118 (e.g., via the communication manager 108B, etc.). In this manner, the WAEE 120A may be used to publish messages across regulatory domains (e.g., from the regulatory domain 102A to the regulatory domain 102B, etc.), across regions within a regulatory domain (e.g., from the region B1 to the region B2 within the regulatory domain 102B, etc.), and/or within a region (e.g., from the messaging platform 104A to the edge message platform 112A.2 within the region A, etc.).

In some implementations of the method 300, the edge device 110 may further consume another event from the messaging platform 104A. For example, the edge device 110A may be subscribed to one or more topics on the messaging platform 104A and, based thereon, may consume other events (or additional events) from the messaging platform 104A that belong to the subscribed topics of the edge device 110A (e.g., as originating from one of the WAEEs 120A or 120E, etc.) (e.g., after appropriate services have been applied thereto, etc.). In connection therewith, the edge device 110 may then publish the event(s) to the edge message platform 112A.1, which allows the communication manage 108A.1 to consume the published output event for communicating data included in the event to the customer 114.

In view of the above, the systems and methods herein provide event-driven architectures, whereby requests are published to messaging platforms under specific topics, and services then subscribe to the topics in order to fulfill the requests. In doing so, the services may be invoked by the events when appropriate, upon identification of appropriate topics for the events (and given services). As such, the topics for the events are relied upon to promote loose or dynamic coupling between the services and the underlying actions required/desired, thereby providing efficiency in introducing new services/subscribers, in implementation of incremental steps, and in further geographic instances of the service without changing the underlying codes of the services, etc. In addition, as described herein, the event-driver architectures also support cross-border services in that they enable application of services based on region deployment and/or regulatory domain boundaries.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code and/or load files (prior to implementation in hardware) in the form of instructions or data structures and that can be accessed by a processor, and/or implemented in hardware. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of: (a) subscribing, by a first consumption computing device (e.g., an edge device, a WAEE, etc.), to a first event topic on an edge message platform; (b) consuming, by the first consumption computing device, a first event published to the first event topic by the communication manager, based on a type of the first event as published to the first event topic, the first event related to a message directed from the first customer to a second customer; and (c) publishing a second event to the messaging platform, the second event related to the message directed from the first customer to a second customer, whereby the second consumption computing device is permitted to consume the second event from the messaging platform to communicate data included in the second event to a second customer.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A network for use in providing event-driven services, the network comprising:
   an event-driven edge message platform;
   an event-driven messaging platform; and
   a first consumption computing device coupled between the event-driven edge message platform and the event-driven messaging platform, the event-driven edge message platform different than the event-driven messaging platform; and
   wherein the first consumption computing device is configured to:
      subscribe to a first event topic on the event-driven edge message platform;
      in response to publication of a first event on the event-driven edge message platform, consume, from the event-driven edge message platform, the first event because the first event i) is published to the first event topic to which the first consumption device is subscribed and ii) includes a first event type, the first event published by a communication manager associated with a first customer;
publish a second event to the event-driven messaging platform under a second event topic different from the first event topic, the second event having the first event type, whereby one or more services subscribed to the second event topic and triggered by the first event type are performed in response to publication of the second event under the second event topic to the event-driven messaging platform; and
publish a third event to the event-driven messaging platform under a third event topic and as a second event type, based on performance of the one or more services.

2. The network of claim 1, wherein the first event is indicative of an authorization request from the first customer for a payment account transaction.

3. The network of claim 1, wherein the one or more services includes a sequence of services, each performed in series based on subsequent event topics of subsequent events published to the event-driven messaging platform.

4. The network of claim 1, further comprising:
a second consumption computing device coupled to the event-driven messaging platform and a second event-driven edge message platform;
wherein the second consumption computing device is configured to consume the third event, from the event-driven messaging platform, based on the second event type of the third event, and to publish a fourth event to the second event-driven edge message platform, whereby a second communication manager is permitted to consume the fourth event and communicate data included in the fourth event to a second customer.

5. The network of claim 4, wherein the first consumption computing device and the second consumption computing device comprise edge devices.

6. The network of claim 1, wherein the first consumption computing device is a cloud-based computing device.

7. The network of claim 1, wherein the first consumption computing device includes an edge device, and wherein the network further includes a wide area event emitter coupled to the event-driven messaging platform and a second event-driven messaging platform;
wherein the wide area event emitter is configured to consume the third event, from the event-driven messaging platform, and to publish a fourth event to the second event-driven messaging platform.

8. The network of claim 7, further comprising a second edge device coupled to the second event-driven messaging platform and a second event-driven edge message platform;
wherein the second edge device is configured to consume the fourth event from the second event-driven messaging platform, and to publish a fifth event to the second event-driven edge message platform, whereby a second communication manager is permitted to consume the fifth event and communicate data included in the fifth event to a second customer.

9. The network of claim 8, wherein the first event-driven messaging platform is located in a first region, and the second event-driven messaging platform is located in a second region separate from the first region.

10. The network of claim 9, wherein the first region and the second region belong to different regulatory domains.

11. The network of claim 10, wherein each of the first region and the second region comprises one of a data center and a cloud region.

12. The network of claim 11, wherein the wide area emitter is configured to publish the fourth event to the second event-driven messaging platform via a wide area network.

13. The network of claim 12, wherein the one or more services includes at least one of an authorization messaging service, a fraud scoring service, a regulatory compliance service, a cross-border messaging service, a currency conversion service, and a token vault service.

14. The network of claim 1, wherein:
the first consumption computing device is configured to consume another event from the event-driven messaging platform relating to a message directed to the first customer; and
the first consumption computing device is configured to publish a further event to the event-driven edge message platform relating to the message directed to the first customer, whereby the communication manager is permitted to consume the further event and communicate data included in the further event to the first customer.

15. A computer-implemented method of providing event-driven services in a network, the network comprising an event-driven edge messaging platform, a communication manager coupled to the event-driven edge message platform and associated with a first customer, an event-driven messaging platform different than the event-driven edge message platform, a first consumption computing device coupled to the event-driven edge message platform, and a second consumption computing device coupled to the event-driven messaging platform, the method comprising:
subscribing, by the first consumption computing device, to a first event topic on the event-driven edge message platform;
in response to publication of a first event on the event-driven edge message platform, consuming, by the first consumption computing device, from the event-driven edge message platform, the first event because the first event i) is published on the event-drive edge message platform to the first event topic to which the first conception computing device is subscribed and ii) includes a first event type, the first event published by the communication manager, the first event related to a message directed from the first customer to a second customer; and
publishing a second event to the event-driven messaging platform, the second event related to the message directed from the first customer to a second customer, whereby the second consumption computing device is permitted to consume the second event from the event-driven messaging platform, based on the first event type, to communicate data included in the second event to the second customer.

16. The computer-implemented method of claim 15, further comprising:
consuming, by the first consumption computing device, a third event from the event-driven messaging platform, the third event related to a message directed from the first customer; and
publishing, by the first consumption computing device, a fourth event to the event-driven edge message platform, the fourth event related to the message directed from the first customer, whereby the second communication manager is permitted to consume the fourth event and communicate data included in the fourth event to the first customer.

17. The computer-implemented method of claim 16, wherein the first and second events and/or the third and fourth events are indicative of an authorization request message involving the first customer and the second customer for a payment account transaction.

18. The computer-implemented method of claim 15, wherein the data included in the second event and/or the fourth event includes data associated with at least one of an authorization messaging service, a fraud scoring service, a regulatory compliance service, a cross-border messaging service, a currency conversion service, and a token vault service.

19. The computer-implemented method of claim 18, wherein publishing the second event includes publishing the second event to the event-driven messaging platform to permit a wide area event emitter to consume the second event and publish a further event to a second event-driven messaging platform; and wherein the first consumption computing device is a cloud-based computing device.

20. The computer-implemented method of claim 15, wherein the first consumption computing device and the second consumption computing device are each selected from an edge device and a wide area event emitter.

\* \* \* \* \*